US008706796B2

(12) United States Patent
Daviss et al.

(10) Patent No.: US 8,706,796 B2
(45) Date of Patent: Apr. 22, 2014

(54) MANAGING A CLUSTER OF COMPUTERS

(75) Inventors: Jeffery Rodd Daviss, Port Coquitlam (CA); Harry Todd Meade, Surrey (CA); Sunil Puri, Burnaby (CA)

(73) Assignee: SAP France S.A., Walldorf (DE)

( * ) Notice: Subject to any disclaimer, the term of this patent is extended or adjusted under 35 U.S.C. 154(b) by 1197 days.

(21) Appl. No.: 11/965,275

(22) Filed: Dec. 27, 2007

(65) Prior Publication Data

US 2009/0172697 A1 Jul. 2, 2009

(51) Int. Cl.
*G06F 15/16* (2006.01)
(52) U.S. Cl.
USPC ............................................. 709/201; 717/174
(58) Field of Classification Search
USPC ................................ 709/201; 717/174; 719/316
See application file for complete search history.

(56) References Cited

U.S. PATENT DOCUMENTS

| 7,039,917 | B2* | 5/2006 | Lister et al. | 718/107 |
| 2002/0152277 | A1* | 10/2002 | Drees | 709/208 |
| 2004/0268292 | A1* | 12/2004 | Steeb et al. | 717/100 |
| 2006/0155912 | A1* | 7/2006 | Singh et al. | 711/6 |
| 2006/0161914 | A1* | 7/2006 | Morrison et al. | 717/174 |
| 2006/0248522 | A1* | 11/2006 | Lakshminarayanan et al. | 717/174 |
| 2006/0271931 | A1* | 11/2006 | Harris et al. | 718/1 |
| 2007/0242646 | A1* | 10/2007 | Matsui et al. | 370/338 |

* cited by examiner

*Primary Examiner* — Thomas Dailey
(74) *Attorney, Agent, or Firm* — Mintz Levin Cohn Ferris Glovsky and Popeo, P.C.

(57) ABSTRACT

A system has a set of servers utilizing different operating systems to constitute a cross-platform system. A central management server has a set of objects characterizing the set of servers. The set of objects have relationship edges to related objects. A server intelligence agent coordinates the start-up of the central management server and the set of servers and coordinates the control of state changes within the set of servers.

22 Claims, 5 Drawing Sheets

MANAGING A CLUSTER OF COMPUTERS

BRIEF DESCRIPTION OF THE INVENTION

This invention relates generally to computer systems. More particularly, this invention relates to a technique for defining and activating servers for business intelligence tasks within a business intelligence system.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, and data warehousing systems for cleansing and consolidating information from disparate sources. Business Intelligence tools work with data management systems, such as relational databases or On Line Analytic Processing (OLAP) systems used to collect, store, and manage raw data.

In recent years, BI tools have permeated business information systems to the point where the reliability, scalability, and flexibility of BI tools directly impact the operational efficiency of enterprise business processes. Business users expect quick access to a wide variety of customized BI tools that provide a rich feature set. This creates a need for local BI tools that are executed against local data sources. This leads to users demanding local BI systems. These local BI systems can evolve independently, creating tool and data versioning issues. Therefore. there is a need to make sharing and distribution of BI tools easier. For example, it is desirable to minimize setup time for BI services or to port servers between sites.

A server is an application program that provides a service to a client. A server application can run on the same computer as the client application using it; alternately, a client can connect through a computer network. A server computer is a computer system that has been designated for running a specific server application or applications.

With known BI servers, the information used to define a server is stored at the server computer that the server is deployed on. The information defines, configures and runs the server. The capabilities of the server are known to it and those that query it. Therefore, a client looking for a particular service typically queries all servers in the BI system.

There exist BI and reporting tools that are implemented in a cluster framework. Clustering can offer greater scalability by providing a collection of interconnected servers deployed as a single, unified computing resource. Users of the BI system access, for example, a server cluster, rather than a single management server machine within the cluster framework. Because each server within a server cluster remains, effectively, anonymous and interchangeable from a client's perspective, the methodology creates the illusion of a single system, while servicing the client needs with the power of distributed processing.

Data and metadata are often stored as objects. In known BI systems there are many different component objects, e.g., reports, files, file folder, users, user groups, schedule objects, data source objects, executable instructions defining a BI tool, and the like. Knowledge about which component objects are related is of importance to the system. This knowledge must be updated as both relationships and component objects are added, modified, or deleted. These requirements create a data structure problem. Some BI systems address this problem by maintaining a set of objects that contain metadata (i.e., data about data) on the component objects. These information objects can be used to models the relationships between the component objects.

In view of the foregoing, it would be highly advantageous to provide improved cluster technology. In particular, it would be highly advantageous to provide an improved cluster technology for the effective deployment of servers.

SUMMARY OF INVENTION

The invention includes a system with a set of servers utilizing different operating systems to constitute a cross-platform system. A central management server has a set of objects characterizing the set of servers. The set of objects have relationship edges to related objects. A server intelligence agent coordinates the start-up of the central management server and the set of servers and coordinates the control of state changes within the set of servers.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
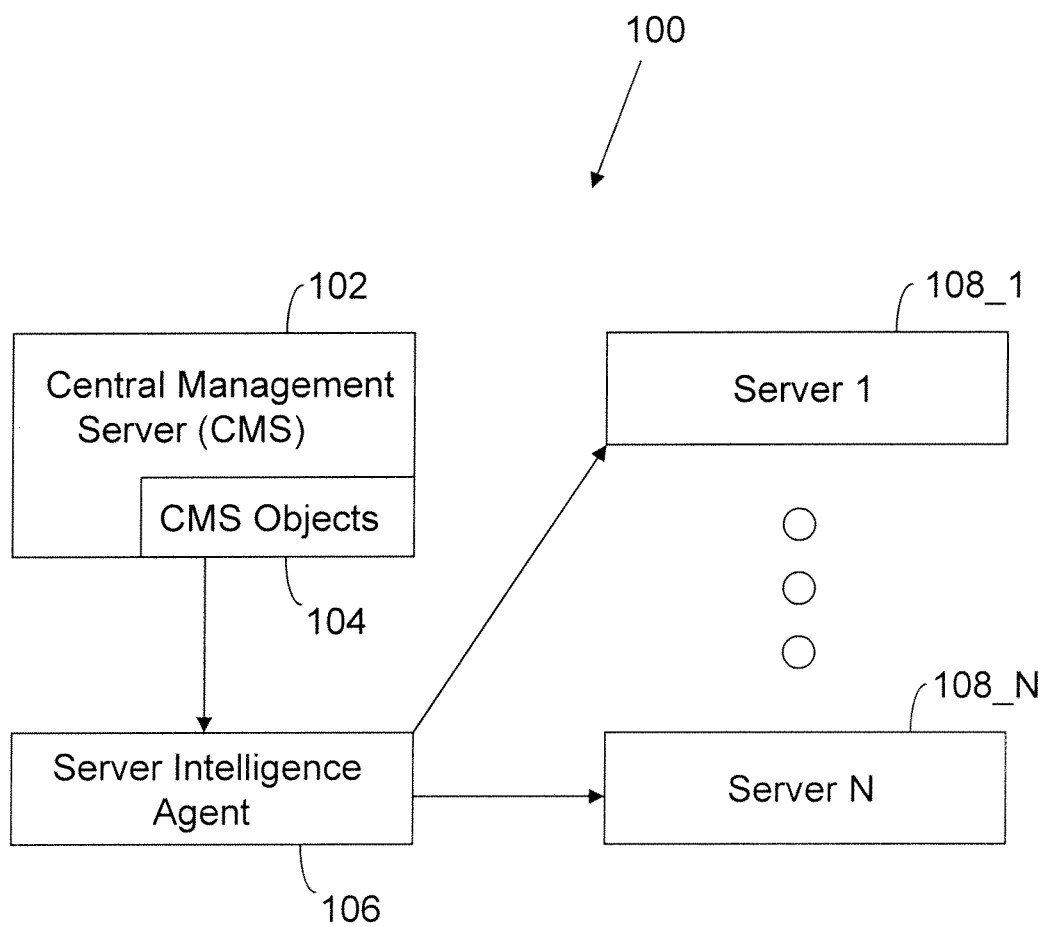
FIG. 1 illustrates a computer system configured in accordance with an embodiment of the invention.

FIG. 1 illustrates a system 100 configured in accordance with an embodiment of the invention. The system 100 comprises a cluster with a collection of interconnected servers deployed as a single computing resource. A cluster is defined by its shared Central Management Server (CMS) 102. That is, the servers 108_1 through 108_N in the cluster use the same CMS 102. Each cluster has at least one Server Intelligence Agent (SIA) 106.

The Central Management Server (CMS) 102 is a platform service responsible for maintaining a database of information about an enterprise system. All platform services are managed and controlled by the CMS. The CMS also manages access to the system repository database where the physical documents are managed. The CMS maintains security, manages objects, manages servers, and performs auditing operations. Server management includes allowing manipulation of the object model that reflects server state and configuration, notifying servers when their configurations change, and keeping track of server state (as reflected by the object model). The CMS may also handle load balancing and automated clustering using techniques to eliminate bottlenecks and maximize hardware efficiency. The CMS includes a set of CMS objects 104, which are discussed below.

The CMS 102 accesses a Server Intelligence Agent (SIA), which is a set of executable instructions that function to manage a server's life cycle. An SIA is a consumer of objects in a server deployment. In particular, an SIA consumes objects characterizing servers. The objects may specify path information, command line parameters, environment variables and information on how to merge environment variables. In one embodiment of the invention, the SIA uses the metadata stored in objects and attributed edges of a deployment model, such as an install object, service—server edge, server—service container edge, and server object. The SIA simplifies the deployment and management of a business intelligence system by allowing centralized and remote administration of server lifetime and improves fault tolerance by automating the starting and stopping of servers. It should be noted that a single SIA will only manage severs configured for a given operating system instance. Preferably, the SIA is written in code that is not specific to a platform (e.g., JAVA®). Similarly, the CMS objects are preferably stored in a manner that is not specific to a platform, although the objects may include platform specific information. The invention is advantageously exploited when the servers 108_1 through 108_N utilize two or more operating systems and therefore constitute a cross-platform system. In such a context, the invention provides centralized control over a hybrid system.

A bootstrap file stores startup information for the SIA plus information about local and remote CMSs. In one embodiment, the bootstrap file includes, for each CMS, an object identification of the corresponding service container instance object and information for launching the CMS or connecting to it—e.g., the CMS hostname and port number.

Each server 108 is an application program that provides a service to a client. A server application can run on the same computer as the client application using it; alternately, a client can connect through a computer network. A server computer is a computer system that has been designated for running a specific server application or applications. Thus, multiple servers may be installed on a server computer.

Figure 2:
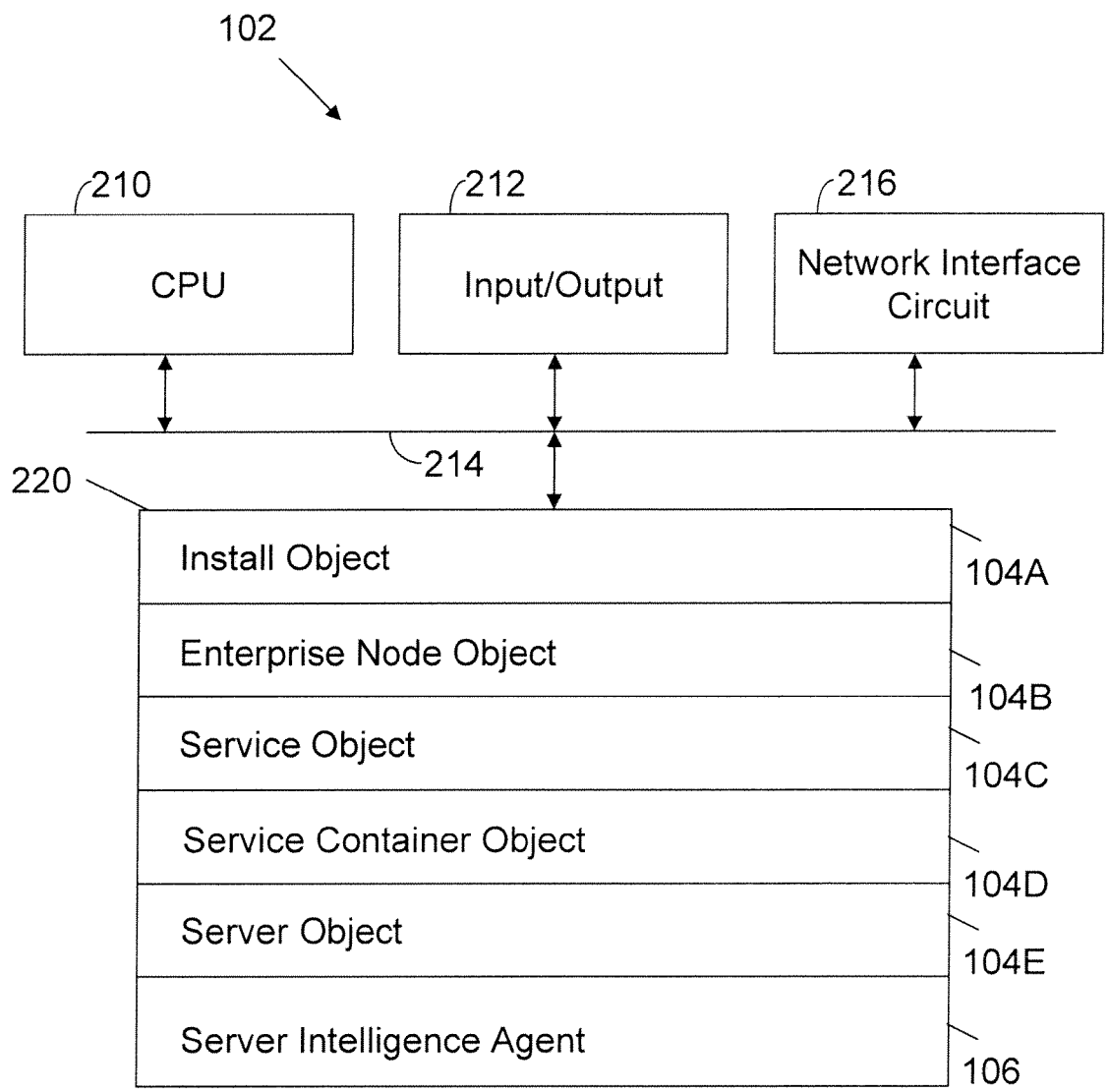
FIG. 2 illustrates a central management server configured in accordance with an embodiment of the invention.

FIG. 2 illustrates an embodiment of the CMS 102. The CMS 102 includes standard components, such as a central processing unit 210, which communicates with a set of input/output devices 212 via a bus 214. The input/output devices 212 may include a keyboard, mouse, display, printer and the like. A network interface circuit 216 is also connected to the bus 214. Thus, the CMS 102 may operate in a networked environment, as shown in FIG. 1.

A memory 220 is also connected to the bus 214. The memory 220 includes a set of objects 104A-104E to implement operations of the invention. In this embodiment, the objects include an install object 104A, an enterprise node object 104B, a service object 104C, a service container object 104D, and a server object 104E. Each of these objects is discussed below. The Server Intelligence Agent (SIA) may also be stored in memory 220.

The configuration of CMS 102 is exemplary. The objects 104 and the SIA may be distributed throughout a network. It is the operations of the invention that are significant, not the precise manner or location where the operations are performed.

The objects 104 and their accompanying relationships contain configuration and deployment information for the servers 108 in the system 100. This information may include: (1) which shared libraries are explicitly loaded by an executable to provide services; (2) the configuration of the services the shared libraries provide; (3) the configuration of the executable that hosts the shared libraries; (4) the machines where the executables execute; and (5) the deployment information of the servers.

Figure 3:
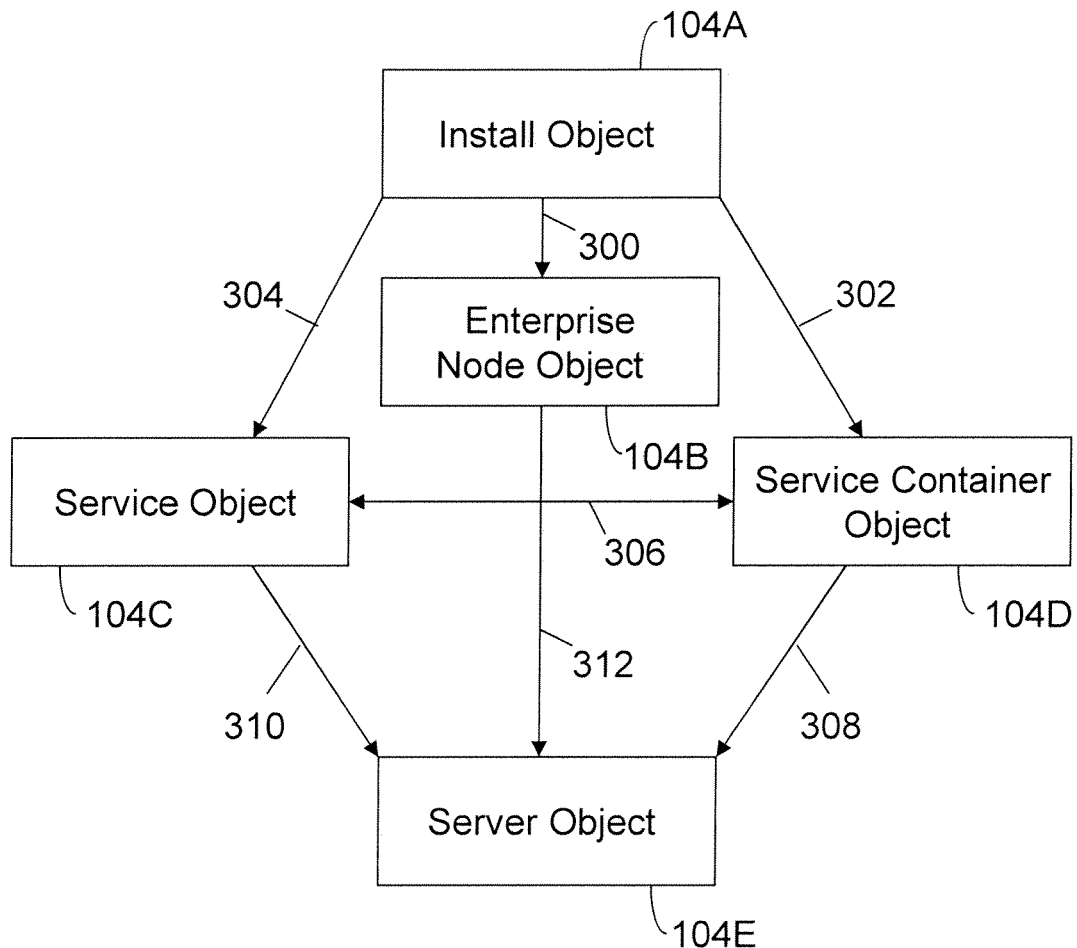
FIG. 3 illustrates object relationships utilized in accordance with an embodiment of the invention.

FIG. 3 illustrates the relationship between various objects utilized in accordance with an embodiment of the invention.

The install object 104A characterizes the set of executable files that make up a system, such as a business intelligence system. The install object specifies entry-point files and arguments used to launch a service. The install object may be used to set and modify environment variables. The install object may also specify files that are used by the service.

An enterprise node object 104B provides the context for launching a server, including the machine on which the service is running and platform-specific information, such as file extensions. The user account under which the service should run is stored in the enterprise node object 104B or by the operating system. In one embodiment, the enterprise node object represents the Server Intelligence Agent (SIA). There is one enterprise node object for every SIA. The SIA uses the information in this object to launch servers. The install object and enterprise node object store information in a platform neutral way. Platform-specific information, such as file extensions and directory paths are stored as properties associated with the install object and the enterprise node object.

A service object 104C characterizes a function hosted in a server. Services that are hosted are represented as relationship edges between the server and a service object. A relationship edge and service object specifies a service's configuration and security information. A server obtains its configuration and execution information from one or more service objects, a service container object, install object, enterprise node object and corresponding relationship edges.

A service container object 104D is an object representing a type of executable container that can host services. For example, a service container object represents a server's executable file. The service container hosts or contains one or more services. A service container object characterizes executable instructions capable of hosting one or more platform services. A service container object specifies configuration and security information.

A server object 104E characterizes a server process. A server object inherits configuration and security information from a service object and a service container object. It also uses the enterprise node object and install object to convert platform-neutral information into path and file names that can be used on its local machine. The server object includes a field specifying the expected running state of a particular server. In one embodiment, the server object includes the command line that the SIA uses to run a server. In one embodiment, the server process is further characterized by an aggregation of the related service container, one or more service objects, the enterprise node object, the install object and relationship edges.

The install object and enterprise node object relationship 300 resolves the installed binaries to a physical location on a disk. For example, this relationship links a set of installed binaries to their mount location on a drive. Relationship edges are specified in the install object 104A and enterprise node object 104B.

The install object and service container object relationship 302 specifies where a service container's executable file is installed. The install object and service object relationship 304 specifies where a service's binaries are installed. Relationship edges are stored in install object 104A and service object 104C.

The service object and service container object relationship 306 specifies the services that an instance of a service container can expose. The relationship identifies the service container that can run a service. Relationship edges appear in the service object 104C and service container object 104D.

The service container object and server object relationship 308 specifies an instance of a service container, such as the server's executable file and parameters (e.g. command line arguments, environment variables, etc.) necessary to launch an application. For example, the relationship explains what the ".exe" part of the server's command line looks like. Relationship edges appear in the server container object 104D and service object 104E.

The service object and server object relationship 310 specifies what services a server provides. The relationship may provide information used to launch the server and information to configure the service. The enterprise node object and server object relationship 312 allows the server to resolve its install location to a physical path. The relationship indicates that a specified SIA controls a specified server.

The invention may also utilize a remote administration mechanism to interact with the central management server to change the servers in a system. The remote administration mechanism may change the set of objects and relationship edges.

The various objects may be implemented as metadata representing physical resources within the system. The use of metadata supports cross-platform functionality (including multiple operating systems). Thus, a cross-platform system may be characterized and managed in accordance with the invention. The metadata may also be interrogated to secure system information.

Figure 4:
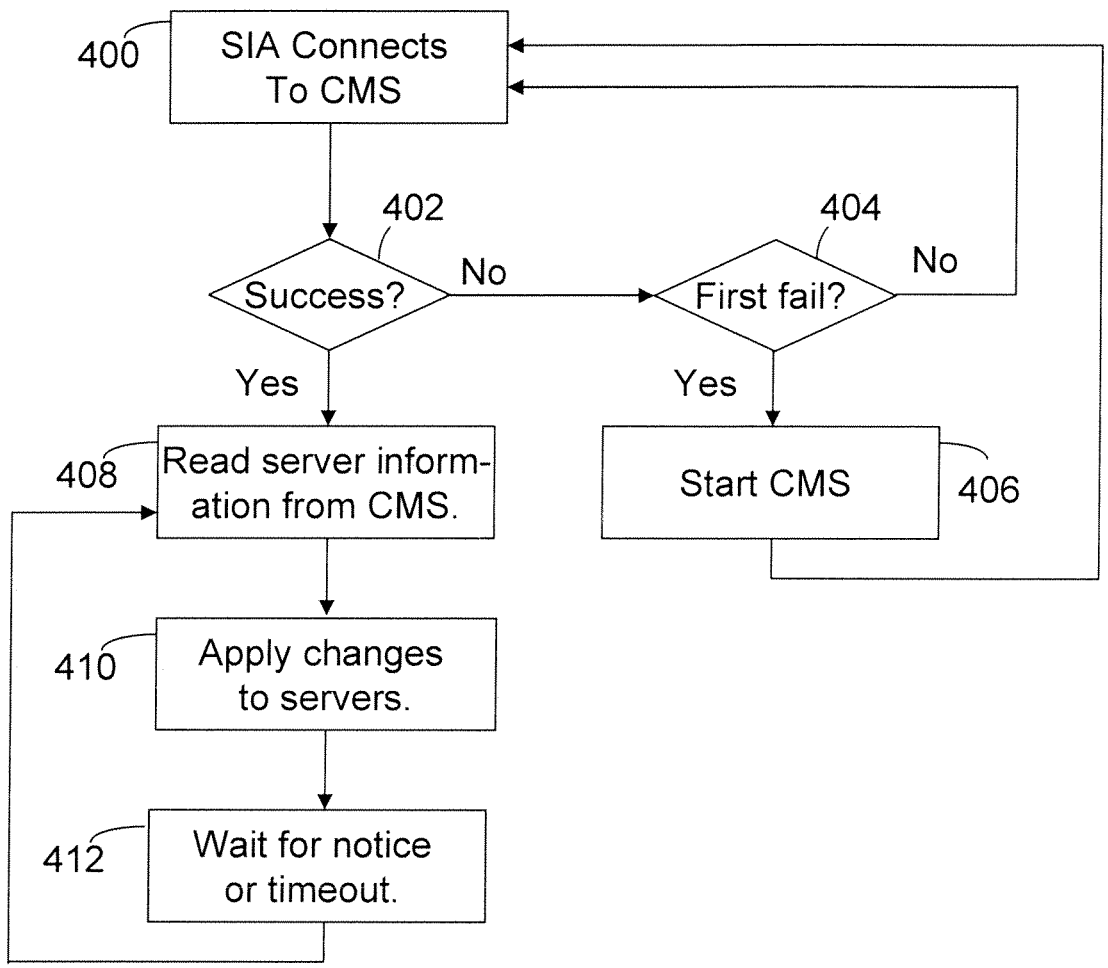
FIG. 4 illustrates processing operations associated with an embodiment of the invention.

FIG. 4 illustrates processing operations associated with SIA 106. Initially, an SIA 106 tries to connect to a CMS 102 (400). The SIA may optionally retrieve CMS connection information from its own command line. The bootstrap file is also queried for CMS connection information. Typically, the bootstrap file indicates which CMSs are supposed to be running and/or automatically started by the SIA.

If the CMS is running (402—YES), then processing proceeds to block 408, as discussed below. If the CMS is not running (402—NO), on a first failed connection attempt (404—YES) the CMS is started (406). After the CMS is started, the SIA tries to connect to the CMS once again. If this is not the first failed connection attempt (404—NO), the SIA tries to connect to the CMS once again.

The CMS specifies a set of servers within its cluster. The SIA reads server information from the CMS (408). At least one of these servers is started.

A server specified in the CMS is started (410). That is, the SIA 106 initiates a command to start a server (e.g., initially server 108_1). After any specified server state change (i.e., a start server or stop server) is completed another server is started. If a specified server does not start, a delay period is optionally incremented and another attempt is made to start the server. The SIA then waits (412). In particular, the SIA waits until it receives notice about further state changes from the CMS or directly from a server. The SIA repeats the cycle from block 408.

In one embodiment, if the SIA cannot connect to a CMS, it tries to launch a CMS that is configured to be automatically started by the SIA. If an SIA cannot connect to any CMS, then it periodically attempts to reconnect to any local and/or remote CMSs that come online. Periodically trying to reconnect can include an incremental delay operation.

Figure 5:
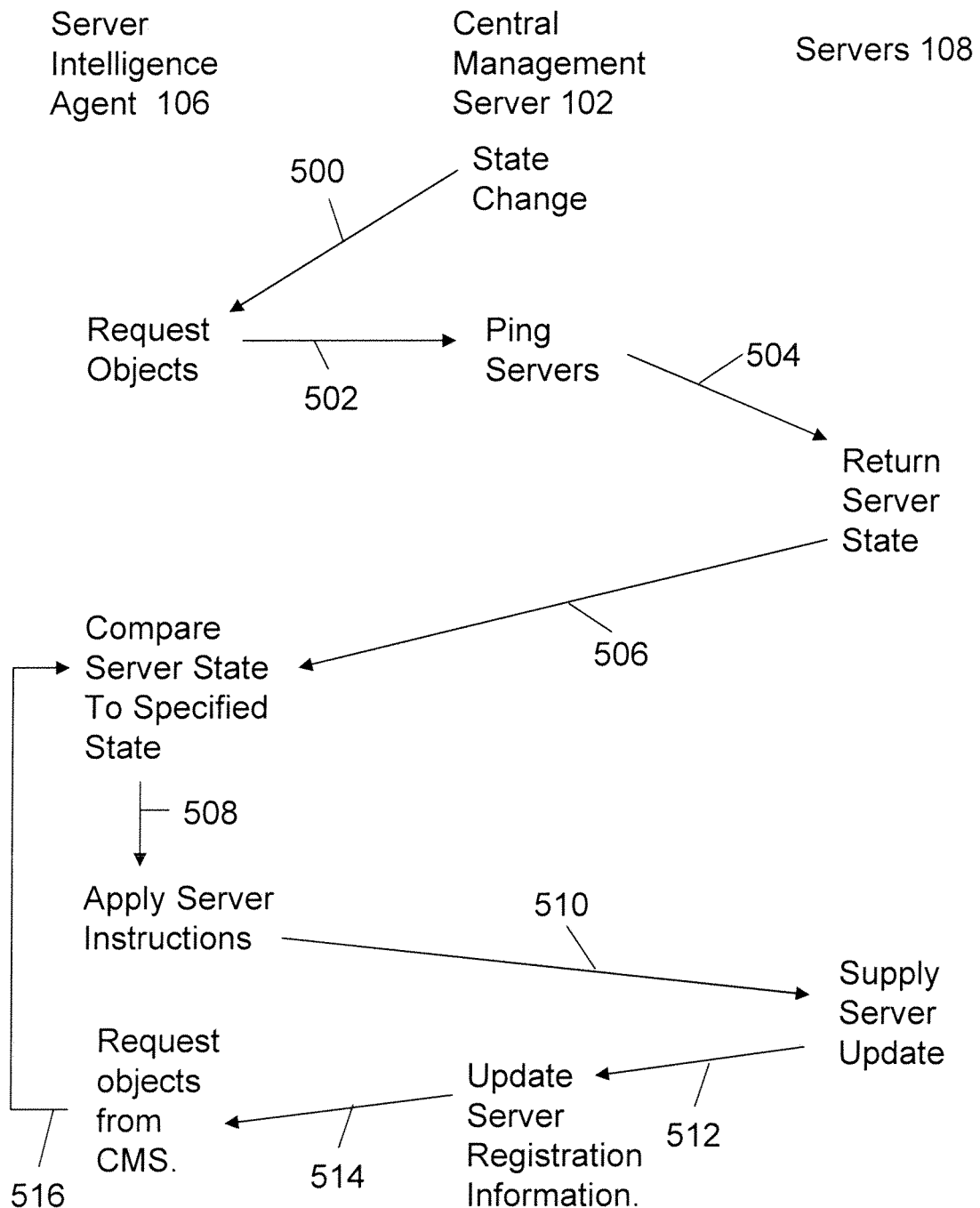
FIG. 5 illustrates the interaction of components associated with an embodiment of the invention.

FIG. 5 illustrates processing associated with the system 100 after start-up. The CMS 102 identifies a system state change and notifies the SIA 106 about this change, as shown with arrow 500. The SIA queries the objects from the CMS 102, as shown with arrow 502. To process this query, CMS 102 uses the object information to ping servers to identify server viability, as shown with arrow 504. Server state information is then passed to the SIA 106 in response to the query, as shown with arrow 506. The SIA compares server state information to specified or expected state information. Any discrepancy results in the SIA 106 specifying server instructions, as shown with arrow 508. The server instructions are then passed to one or more servers, as shown with arrow 510. Each server 108 applies the instructions and supplies an update, as shown with arrow 512. The SIA then updates the server registration information and invokes another comparison with specified state, as shown with arrow 514. Each server 108 applies the instructions and supplies an update to the CMS, as shown with arrow 512. The server registration information is updated in the CMS. The CMS then notifies the SIA (arrow 514) of the server registration updates, which then initiates another comparison with the specified state, as shown with arrow 516. In some scenarios, the SIA can receive direct notifications from the servers 108 of server state (not shown).

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:
1. A system, comprising:
a plurality of interconnected servers utilizing a plurality of operating systems to constitute a cross-platform system, the plurality of interconnected servers being deployed as a single computer resource;
a central management server with a set of objects characterizing the plurality of interconnected servers, wherein the set of objects have relationship edges to related objects, and wherein the relationship edges contain configuration and deployment information for the plurality of interconnected servers, wherein the set of objects are stored in a manner that is not specific to a particular platform and the objects comprise platform specific information; and a server intelligence agent to coordinate the start-up of the central management server and the plurality of interconnected servers, and to automate the starting and stopping of the plurality of interconnected servers;

wherein:

the server intelligence agent, upon receipt of a state change notification from a centralized management server, sends a query of objects to the centralized system;

the centralized system, in response to the query, returns server state information from one or more servers to the server intelligence agent;

the server intelligence agent compares the returned server state information with specified or expected state information;

the server intelligence agent, based on the comparing of the returned server state information with the specified or expected state information, generates server instructions and transmits the generated server instructions to the one or more servers; and the server intelligence agent receives registration updates for the one or more servers subsequent to the transmission of the generated server instructions.

2. The system of claim 1 wherein the set of objects includes an install object characterizing a set of executable files that compose the system.

3. The system of claim 2 wherein the install object specifies entry-point files to provide information to launch a server and arguments used to launch a service supported by the server.

4. The system of claim 1 wherein the set of objects includes an enterprise node object for providing information to launch a server.

5. The system of claim 4 wherein the enterprise node object further provides information on the server intelligence agent.

6. The system of claim 1 wherein the set of objects includes a service object characterizing a function hosted in a server.

7. The system of claim 6 wherein the service object specifies server configuration and security information.

8. The system of claim 1 wherein the set of objects includes a service container object representing an executable file of a server.

9. The system of claim 8 wherein the service container object hosts a plurality of services.

10. The system of claim 1 wherein the set of objects includes a server object characterizing a server.

11. The system of claim 10 wherein the server object uses enterprise node object information and install object information to convert platform-neutral information into path and file names that can be used on a local machine.

12. The system of claim 1 wherein the relationship edges include an install object and enterprise node object relationship that resolves installed binaries to a physical location on a disk.

13. The system of claim 1 wherein the relationship edges include an install object and service container object relationship that specifies the location of an executable file for a service container.

14. The system of claim 1 wherein the relationship edges include an install object and service object relationship that specifies the location of binary files associated with a service.

15. The system of claim 1 wherein the relationship edges include a service object and service container object relationship that specifies the services that an instance of a service container hosts.

16. The system of claim 1 wherein the relationship edges include a service container object and server object relationship that specifies an instance of a service container.

17. The system of claim 1 wherein the relationship edges include a service object and server object relationship that specifies services provided by a server, the information used to launch the server, and information to configure the service.

18. The system of claim 1 wherein the relationship edge includes an enterprise node object and server object relationship that allows a server to resolve its install location to a physical path.

19. The system of claim 1 further comprising a remote administration mechanism for interacting with the central management server to change the plurality of servers, wherein the remote administration mechanism changes the set of objects and relationship edges.

20. The system of claim 1, wherein the configuration and deployment information includes one or more of:

shared libraries that are explicitly loaded by an executable to provide services;

configuration of the services provided by the shared libraries;

configuration of the executable that hosts the shared libraries;

machines where the executables execute; and deployment information of the plurality of interconnected servers.

21. A method comprising:

sending, by a server intelligence agent, upon receipt of a state change notification from a centralized management server, a query of objects to a centralized system, wherein the objects are stored in a manner that is not specific to a particular platform and the objects comprises platform specific information;

returning, by the centralized system in response to the query, server state information from one or more servers to the server intelligence agent;

comparing, by the server intelligence agent, the returned server state information with specified or expected state information;

generating, by the server intelligence agent based on the comparing of the returned server state information with the specified or expected state information, server instructions and transmitting the generated server instructions to the one or more servers; and receiving, by the server intelligence agent, registration updates for the one or more servers subsequent to the transmission of the generated server instructions.

22. A non-transitory computer program product storing instructions, which when executed by at least one data processor, result in operations comprising:

sending, by a server intelligence agent, upon receipt of a state change notification from a centralized management server, a query of objects to a centralized system, wherein the objects are stored in a manner that is not specific to a particular platform and the objects comprise platform specific information;

returning, by the centralized system in response to the query, server state information from one or more servers to the server intelligence agent;

comparing, by the server intelligence agent, the returned server state information with specified or expected state information;

generating, by the server intelligence agent based on the comparing of the returned server state information with the specified or expected state information, server instructions and transmitting the generated server instructions to the one or more servers; and receiving, by the server intelligence agent, registration updates for the one or more servers subsequent to the transmission of the generated server instructions.

\* \* \* \* \*